(12) United States Patent
Smets et al.

(10) Patent No.: US 7,717,346 B2
(45) Date of Patent: May 18, 2010

(54) COLLISION DETECTION AND AVOIDANCE SCHEME FOR CONTACTLESS CARD PAYMENT SYSTEMS

(75) Inventors: Patrick Smets, Nijlen (BE); Eddy Lodewijk Hortensia Van De Velde, Leuven (BE); Duncan Garrett, London (GB)

(73) Assignee: MasterCard International Incorporated, Purchase, NY (US)

( * ) Notice: Subject to any disclaimer, the term of this patent is extended or adjusted under 35 U.S.C. 154(b) by 828 days.

(21) Appl. No.: 11/182,355

(22) Filed: Jul. 15, 2005

(65) Prior Publication Data

US 2006/0022042 A1 Feb. 2, 2006

Related U.S. Application Data

(60) Provisional application No. 60/588,270, filed on Jul. 15, 2004.

(51) Int. Cl.
*G06K 7/00* (2006.01)

(52) U.S. Cl. ............... 235/486; 235/384; 235/380; 340/10.1

(58) Field of Classification Search ............ 235/486, 235/380, 446, 449, 492, 485, 487, 384, 451, 235/441; 705/64, 16; 340/10.1, 572.2
See application file for complete search history.

(56) References Cited

U.S. PATENT DOCUMENTS

| | | | |
|---|---|---|---|
| 4,066,873 A | 1/1978 | Schatz | 235/487 |
| 4,697,073 A | 9/1987 | Hara | 235/487 |
| 5,225,977 A | 7/1993 | Hooper et al. | 364/401 |
| 5,466,919 A | 11/1995 | Hovakimian | 235/380 |
| 5,511,114 A | 4/1996 | Stimson et al. | 379/114 |
| 5,623,552 A | 4/1997 | Lane | 382/124 |
| 5,625,628 A * | 4/1997 | Heath | 370/321 |
| 5,698,837 A * | 12/1997 | Furuta | 235/492 |
| 5,748,737 A | 5/1998 | Daggar | 380/24 |
| 5,808,558 A | 9/1998 | Meek et al. | |
| 5,880,452 A | 3/1999 | Plesko | 235/472 |
| 6,010,074 A | 1/2000 | Kelly et al. | |
| 6,028,920 A | 2/2000 | Carson | 379/114 |
| 6,061,344 A * | 5/2000 | Wood, Jr. | 370/346 |

(Continued)

FOREIGN PATENT DOCUMENTS

EP 1460592 8/2004

(Continued)

OTHER PUBLICATIONS

Contactless Material (WG8); SmartCard Secure Operating System at www.jayacard.org; 3 pages; www.14443.org-Contactless Documentation.

*Primary Examiner*—Edwyn Labaze
(74) *Attorney, Agent, or Firm*—Baker Botts L.L.P.

(57) ABSTRACT

An electronic payment system for conducting transactions by presenting a contactless payment card to a card reader. The card reader processes transactions when only one card is present in its operating field. The card reader uses collision detection and avoidance algorithms to detect and report instances where multiple cards are present in the operating field. In response to a reported collision, the collision may be cleared by manual intervention, i.e., by physically removing excess cards from the reader's operating field.

20 Claims, 4 Drawing Sheets

U.S. PATENT DOCUMENTS

| | | | |
|---|---|---|---|
| 6,112,981 A | 9/2000 | McCall | 235/380 |
| 6,119,940 A | 9/2000 | Klug | |
| 6,240,515 B1 | 5/2001 | Carnegie et al. | |
| 6,315,195 B1 | 11/2001 | Ramachandran | 235/380 |
| 6,318,633 B1 | 11/2001 | Drexler | 235/454 |
| 6,354,500 B1 * | 3/2002 | Gercekci et al. | 235/451 |
| 6,369,719 B1 | 4/2002 | Tracy et al. | |
| 6,394,346 B1 | 5/2002 | Bonneau, Jr. et al. | |
| 6,547,148 B2 * | 4/2003 | Kelly et al. | 235/492 |
| 6,577,229 B1 | 6/2003 | Bonneau et al. | |
| 7,253,717 B2 * | 8/2007 | Armstrong et al. | 340/10.2 |
| 7,274,284 B2 * | 9/2007 | Dressen | 340/10.2 |
| 2001/0001856 A1 | 5/2001 | Gould et al. | 705/39 |
| 2001/0024157 A1 | 9/2001 | Hansmann et al. | |
| 2001/0034565 A1 | 10/2001 | Leatherman | |
| 2002/0046116 A1 | 4/2002 | Hohle et al. | 705/14 |
| 2002/0046117 A1 | 4/2002 | Marion | |
| 2002/0199054 A1 | 12/2002 | Akahane et al. | |
| 2003/0001755 A1 * | 1/2003 | Tiernay et al. | 340/928 |
| 2003/0167207 A1 | 9/2003 | Berardi et al. | |
| 2004/0068472 A1 * | 4/2004 | Sahota et al. | 705/64 |
| 2005/0056704 A1 * | 3/2005 | Kim | 235/492 |
| 2006/0022815 A1 * | 2/2006 | Fischer et al. | 340/505 |
| 2006/0144943 A1 * | 7/2006 | Kim | 235/451 |
| 2006/0273176 A1 * | 12/2006 | Audebert et al. | 235/451 |

FOREIGN PATENT DOCUMENTS

| | | |
|---|---|---|
| JP | 2001-076117 | 3/2001 |
| WO | WO 92/16913 | 1/1992 |

* cited by examiner

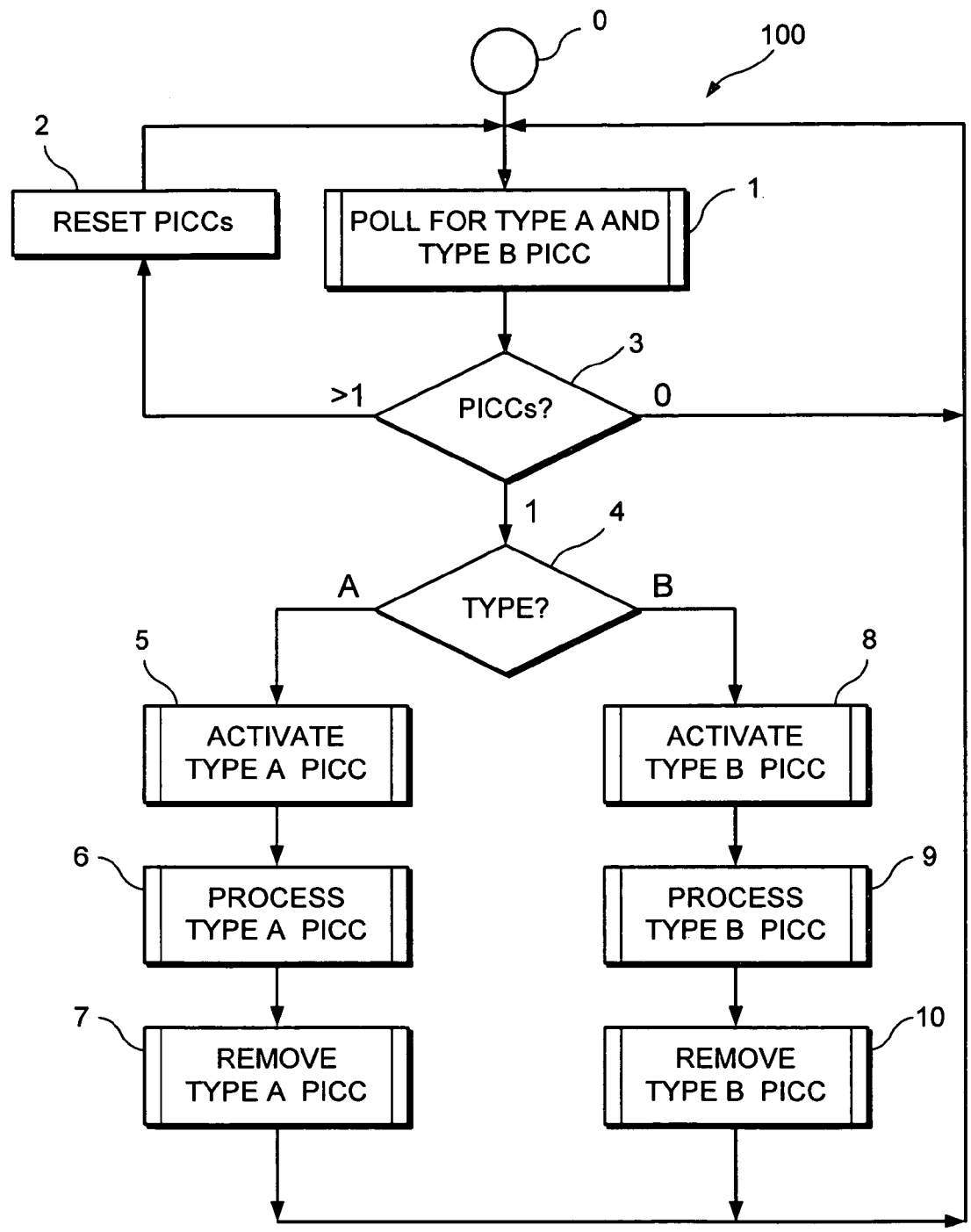
F I G. 1

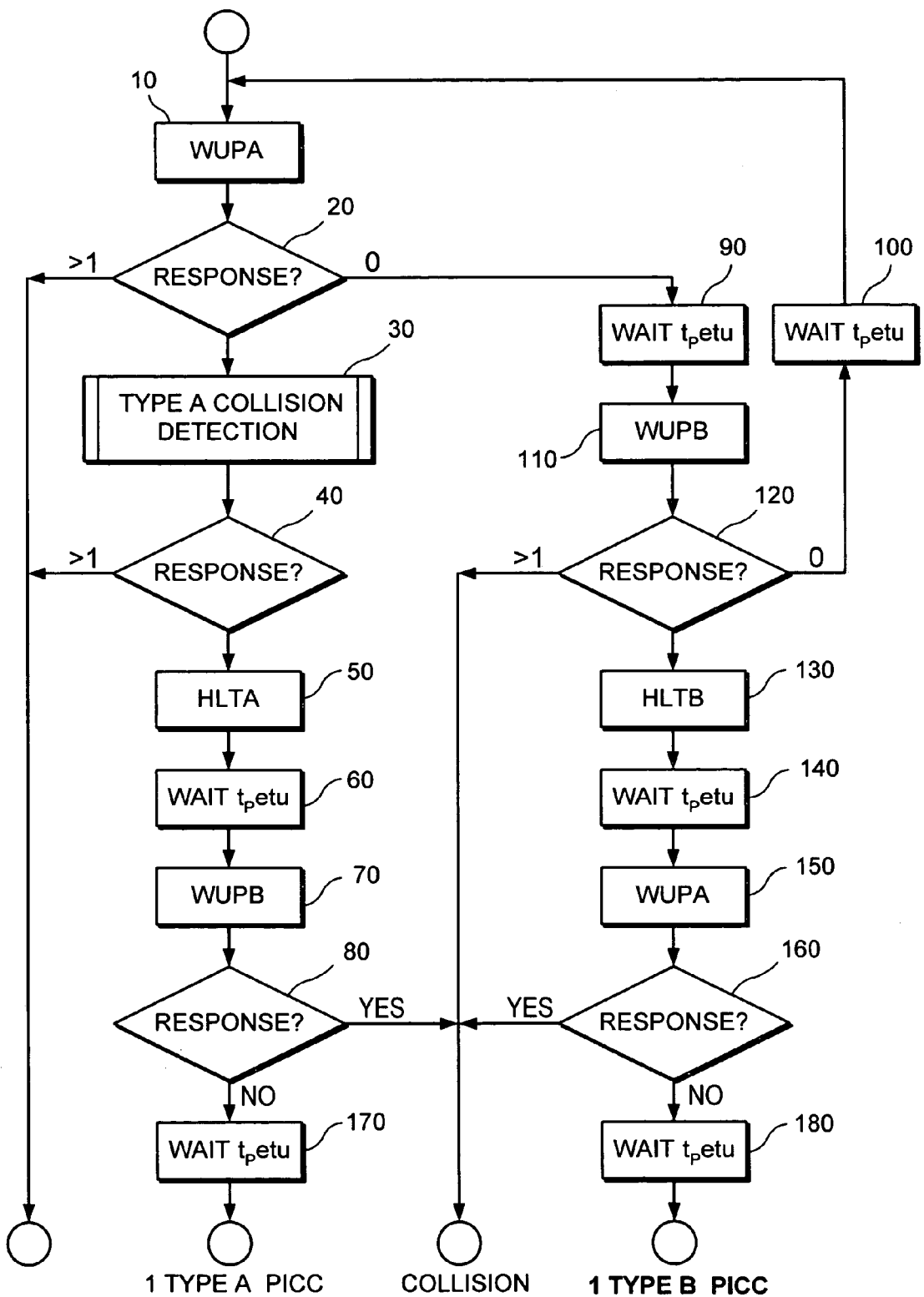
F I G. 2

COLLISION DETECTION AND AVOIDANCE SCHEME FOR CONTACTLESS CARD PAYMENT SYSTEMS

CROSS-REFERENCE TO RELATED APPLICATIONS

This application claims the benefit of U.S. provisional patent application No. 60/588,270 filed on Jul. 15, 2004. This application is also related to U.S. patent application Ser. No. 11/182,354, and Ser. No. 11/182,356, Ser. No. 11/182,357, and Ser. No. 11/182,358, co-filed on even date, all of which claim the benefit of the aforementioned patent application No. 60/588,270. All of the aforementioned patent applications are hereby incorporated by reference herein in their entireties

BACKGROUND OF THE INVENTION

Radio Frequency Identification (RFID) tags are small integrated circuits (ICs) connected to an antenna, which can respond to an interrogating RF signal with simple identifying information, or with more complex signals depending on the size of the IC. RFID technology does not require contact or line of sight for communication. Radio Frequency Identification (RFID) technology is now economically viable and is deployed in more and more commercial and industrial applications. For example, RFID technology is now widely used for tags on items in warehouses, shops, ID or access cards, etc. In addition, RFID technology has been introduced in the payment card industry (e.g., by MasterCard, American Express and Visa) in the form of "contactless" payment or credit cards embedded with RFID tags. These contactless payment cards can be used to make electronic payment transactions via radio communication with an RFID-enabled payment terminal. The contactless payment cards can provide consumers with simple, fast and convenient ways to pay for goods and services, for example, in retail establishments, stores or supermarkets.

Several RFID technologies are available for use in contactless payment cards and card readers/terminals. The basic components of a contactless system are the contactless reader (or Proximity Coupling Device (PCD)) and a transponder. The contactless reader is an antenna connected to an electronic circuit. A transponder consists of an inductive antenna and an integrated circuit connected to the ends of this antenna. The combination reader-transponder behaves as a transformer. An alternating current passes through a primary coil (reader antenna) that creates an electromagnetic field, which induces a current in the secondary coil (transponder antenna). The transponder converts the electromagnetic field (or RF field) transmitted by the contactless reader (PCD) into a DC voltage by means of a diode rectifier. This DC voltage powers up the transponder's internal circuits. The configuration and tuning of both antennas determines the coupling efficiency from one device to the other. The transponders may be the contactless payment cards.

For contactless payment card systems to be economically viable and to gain commercial acceptance, the contactless payment cards must be interoperable at all or most RFID-enabled payment terminals, even when the cards and terminals have technological features that are proprietary to specific card providers/issuers, vendors or terminal manufacturers. Industry-wide interoperability is desirable. Towards this end, industry standards organizations and groups (e.g., International Organization for Standards (ISO) and International Electro Technical Committee (IEC)) have formulated voluntary industry standards for implementation of contactless payment technologies. Three such exemplary standards which have been defined by ISO/IEC are the ISO/IEC 10536, ISO/IEC 14443, and ISO/IEC 15693 standards applicable to Close Coupling, Proximity and Vicinity cards, respectively.

The ISO/IEC 14443 proximity card standards (ISO 14443) have been used for several contactless card deployments worldwide. The targeted range of operations for ISO 14443 proximity cards is up to 10 cm, although this range varies depending on power requirements, memory size, CPU, and co-processor.

The ISO 14443 standards document has four distinct parts:

Part 1: Physical Characteristics, defines the physical dimensions for a Proximity Integrated Circuit Card (PICC). The card is the ID-1 size (85.6 mm×54.0 mm×0.76 mm). This is the same size as a bank credit card.

Part 2: Radio Frequency Power and Signal Interface, defines key technical characteristics of the contactless IC chips, including items such as frequency, data rate, modulation, and bit coding procedures. Two variations are detailed in Part 2, the Type A interface and the Type B interface. Both operate at the same frequency and use the same data rate, but they differ from one another in the areas of modulation and bit coding.

Part 3: Initialization and Anticollision. Initialization describes the requirements for proximity coupling device (PCD) (i.e., the reader) and the card to establish communication when the card is brought into the reader's radio frequency (RF) field. Anticollision defines what happens when multiple cards enter the magnetic field at the same time, identifying how the system determines which card to use in the transaction and ensuring that all cards presented are inventoried and processed.

Part 4: Transmission Protocols, defines the data format and data elements that enable communication during a transaction.

For a system of contactless payment cards and card readers to be compliant with ISO 14443, they must meet the requirements of at least some of parts of the voluntary standard. In addition to contactless technologies that are standardized under ISO 14443, a number of proprietary contactless interfaces are also used in the industry (e.g., Cubic's GO-Card and Sony's FeliCa card). With existing card technology deployments, interoperability can be an issue. Card readers deployed by vendors in the marketplace should preferably accommodate several different card types. For example, a desirable card reader would support ISO 14443 Type A and Type B cards, ISO 15693 cards and any additional proprietary card types.

Interoperability issues can arise even with card deployments that are presumably compliant with a single ISO standard (e.g., ISO 14443). In the ISO 14443 standard, all requirements or specifications related to RF Power and signal interfaces in the contactless card and reader system (i.e., the physical layer in an Open System Interconnection (OSI) model view of the system) are defined using separate standardized tests for cards and for readers. The ISO/IEC 10373 Standard Part 6 (ISO 10373-6) deals with test methods, which are specific to contactless integrated circuit card technology (proximity card). Compliance of contactless cards and readers to ISO 14443 is verified using reference devices. According to ISO 10373-6, a set of "reference" cards (i.e., Reference PICC), which represent the characteristics of contactless cards, is used for measuring specification compliance of a contactless reader. For example, the Reference PICC is used to test the magnetic field produced or transmitted by a PCD, and to test the ability of the PCD to power a PICC. Similarly, a "reference" reader (i.e., a Test or Reference PCD), which may represent the characteristics of a typical contactless reader, is used for measuring specification compliance of contactless cards. For example, the Reference PCD in conjunction with a pair of external sense coils is used to test the load modulation that is generated by cards during testing.

While the separate card and reader compliance test procedures under ISO 10373-6 may ensure that deployed product devices individually have characteristics that fall in either the designated specification range for cards or readers, the procedures do not ensure interoperability in the field. Cards and/or readers verified as compliant may be only marginally so (e.g., by having a characteristic value at the end or edge of a designated specification range). This manner of standards compliance can lead to operational failure in the field. For example, a marginally compliant card may be unreadable or difficult to read using a card reader that is also only marginally compliant.

Further, with respect to verifying important data transmission and reception functions of contactless devices, ISO 10373-6 makes provisions for only indirect measurements of the load modulated data signals generated by cards. A PCD Test Assembly prescribed by ISO 10373-6 for testing product cards has a pair of sense coils that are external to the reference PCD reader. These external sense coils are utilized to measure the load modulated data signal generated and transmitted by card under test. However, there is no direct or obvious relation between the load modulated signal measured by the sense coils and the signal that is physically received by the reference PCD antenna. Therefore, testing of data transmission functions of a product card using the external sense coils does provide direct assurance that a putatively ISO compliant product card's modulation of data signals is sufficient or compatible with a product reader's ability to receive or process the modulated data signals properly.

U.S. patent application Ser. No. 11/182,354, Ser. No. 11/182,356, Ser. No. 11/182,357, and Ser. No. 11/182,358 disclose solutions for enhancing device interoperability based on improvements in specification definitions, compliance testing, and in test equipment related to the RF power and signal interface between interacting card and reader devices.

Consideration is now being given to further ways of enhancing interoperability of the electronic payment devices and also to making the operation the contactless electronic payment systems robust and failure proof. Attention is now directed to aspects of electronic payment systems related to the physical characteristics of payment devices, and to initialization and anticollision schemes.

SUMMARY OF THE INVENTION

The present invention provides a collision detection and avoidance scheme for processing transactions involving interacting contactless payment cards and card readers in an electronic payment system. The collision detection and avoidance scheme is based on a rule that a transaction is to be processed if and only if one payment card is present in the operating field of the card reader. If more than one card is present in the operating field of the card reader, transaction processing is halted. The scheme requires external intervention to remove excess cards, selection and resubmission of only one card before transaction processing can resume.

In the electronic payment system, the card reader is configured to process transactions when only one card is present in its operating field. The card reader uses collision detection and avoidance algorithms to detect and report instances where multiple cards are present in the operating field.

A collision detection and avoidance algorithm involves investigating the presence of multiple payment cards in the operating field of the card reader and halting processing of the transaction when more than one payment card is present. In the collision detection and avoidance algorithm, a card polling sequence initiated by the reader polls and awaits responses from cards that may be present in the operating field of the card reader. If more than one type of cards are supported by the reader, the polling sequence includes wake-up commands for all supported types of cards. For example, the polling sequence may include alternating wake-up commands for the ISO 14443 Type A and Type B cards. When only one card is found to be present in the operating field of the card reader, the collision detection and avoidance algorithm identifies the type of the card. The reader may then activate a communication session with the subject card using activation commands appropriate to the identified type of the card. After a transaction with the identified card has been processed, the card is deactivated and removed.

The collision detection and avoidance algorithm uses a binary search technique to detect collisions of ISO 14443 Type A contactless payment cards. The collision detection and avoidance algorithm employs a Slotted Aloha technique to detect collisions of ISO 14443 Type B contactless payment cards. After one card of a particular type (e.g., Type A or Type B) has been identified as present in the card reader's operating field, polling is conducted for presence of other types of card to check that only one card of any type is present.

Further features of the invention, its nature and various advantages will be more apparent from the accompanying drawings and Appendix and the following detailed description.

BRIEF DESCRIPTION OF THE DRAWINGS AND APPENDIX

FIG. 1 is flow chart illustrating the steps in an exemplary terminal process loop for collision detection and avoidance, in accordance with the principles of the present invention.

FIG. 2 is flow chart illustrating the steps in a generic polling and collision detection process run in a PCD, in accordance with the principles of the present invention.

Figure 3A:
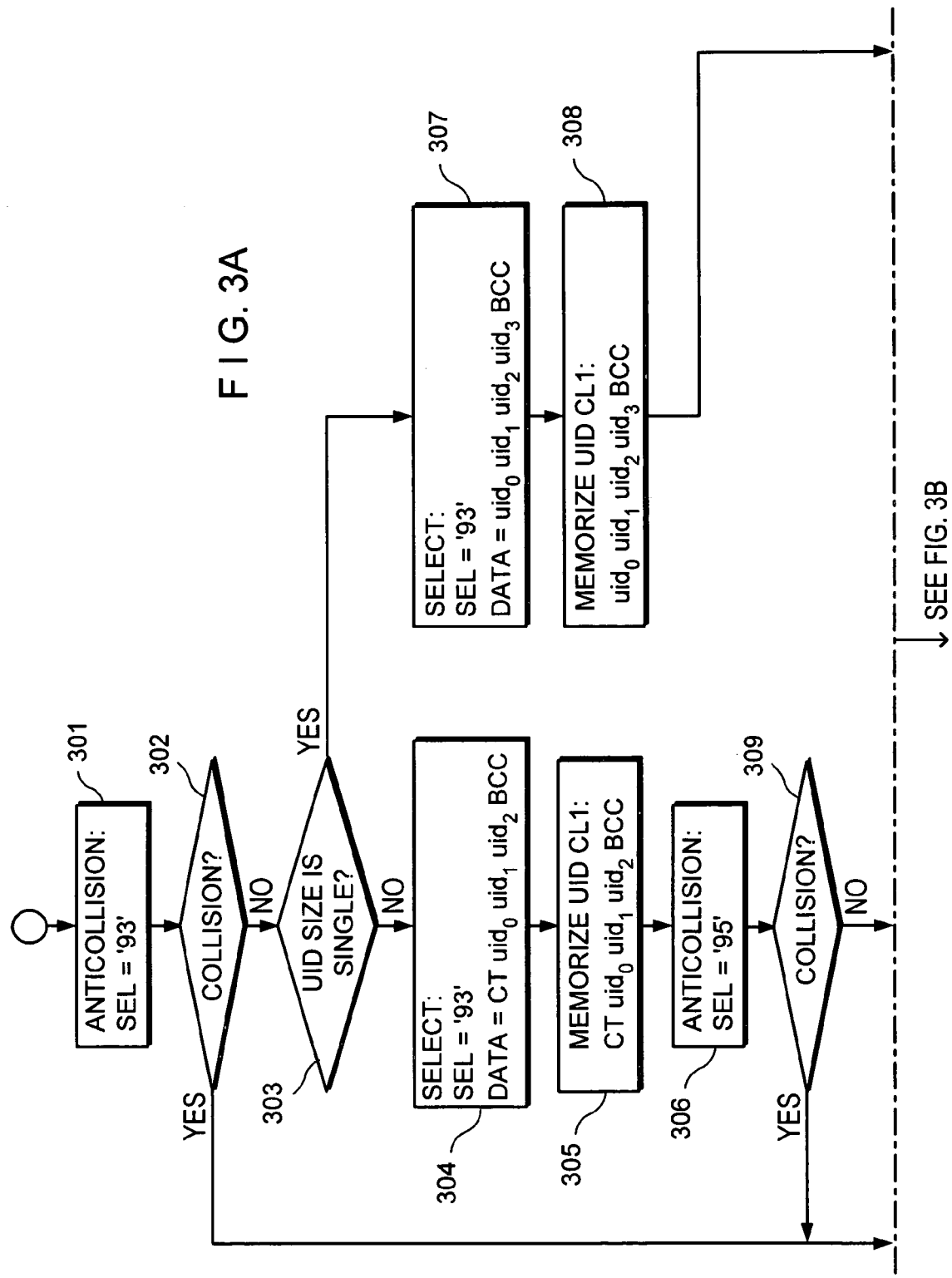
FIG. 3 is flow chart illustrating the steps in an exemplary detection algorithm 300, which may be used to investigate Type A card collisions in accordance with the principles of the present invention.

Appendix A contains descriptions of a set of commands and responses available to a PCD for polling and collision detection processes and for the activation of a Type A PICC. The set of commands are used in an exemplary implementation of proximity payment card technologies by the assignee MasterCard. The commands and responses described in Appendix A are referred to in FIGS. 2 and 3 and in the following description. The commands available to a PCD for polling and collision detection processes and for activation of a Type B card are similar. For brevity, a description of commands and response for Type B card are not included herein.

DETAILED DESCRIPTION OF THE INVENTION

A collision detection and avoidance scheme for initiating and conducting electronic transactions using a payment card and a card reader is provided. Initialization describes the requirements for the reader and the card to establish communication when the card is brought into the reader's radio frequency (RF) field. Collision refers to situations where multiple cards enter the operating volume or field of the reader at the same time, for example, when several store customers in a rush present their cards simultaneously to the reader, or when a customer inadvertently presents a wallet holding several cards to the reader. The reader processes include collision detection processes and alarm generation processes. The alarm generation processes may lead to manual intervention to clear the collision or to user identification of a single card for continued electronic transaction processing. The collision detection and avoidance scheme may be implemented in readers, which support more than one type of cards (e.g., both Type A and Type B cards).

The collision detection and avoidance scheme of the present invention overcomes known drawbacks of conventional anticollision schemes that are used in or recommended for electronic payment systems. The various proximity card standards, which have been used for several contactless card deployments worldwide, generally recommend anticollision processes to deal with the presence of multiple cards in a reader's operating volume or field. For example, ISO 14443 Part 3 recommends anticollision algorithms (loops) to detect and communicate with one particular card when several cards are presented to the same reader. Under ISO 14443 Part 3, the reader first polls and inventories all cards entering its field using polling commands such as Request (REQ) and Answer To Request (ATQ) commands. Then, an anticollision algorithm or loop is used to prepare for dialogue between the reader and one or more selected cards out of the total number of cards responding to a request command. For Type A cards, a binary search algorithm based on the unique identifier (UID) of each card is prescribed. For Type B cards, a Slotted Aloha algorithm with special slot markers is prescribed. The ISO 14443 initialization and anticollision scheme is designed to permit the construction of readers capable of communication with several cards of the same type, which are powered simultaneously. Both card Types A and B wait silently in the field for a polling command. A multi-protocol reader using the ISO 14443 initialization and anticollision scheme would poll one type (e.g., Type A), complete any transactions with all cards responding, and then poll for the other type (e.g., Type B), and transact with them.

The ISO 14443 anticollision schemes have known drawbacks. For example, the anticollision algorithms can become corrupted if cards enter and/or leave the reader field after they have been inventoried or tallied. Further, concurrent reader communication with a number of cards distributes available power, which is limited, between the cards. Low power availability may affect card functionality. These drawbacks are overcome by the collision detection and avoidance scheme of the present invention.

Recently, assignee MasterCard International Incorporated ("MasterCard") has developed proprietary specifications MasterCard PayPass™ ISO/IEC 14443 Implementation Specification ("PayPass") for implementation of proximity payment card technologies (e.g., by issuers, vendors or manufacturers of cards and card readers). The inventive anticollision scheme the present invention is described for purposes of illustration in the context of the exemplary PayPass implementation. It will be understood that the selection of the PayPass implementation for purposes of illustration herein is only exemplary, and that the principles of the present invention can be more generally applied to any electronic payment system involving interacting cards and card readers.

The collision detection and avoidance scheme is described with reference to transactions conducted when cards are presented, for example, to a terminal device at a point of transaction (e.g., at a store checkout stand). The terminal device includes a card reader (PCD) and may include other electronics, transaction processing applications, user interfaces (e.g., display screens) and communication interfaces (e.g., to a host computer). The inventive collision detection and avoidance scheme is based on the rule that only one PICC or card must be detected or sensed in the operating field of the card reader before the card reader or terminal is allowed to initiate or continue any transaction processing. If more than one card is sensed or detected, the scheme requires manual intervention to remove excess cards, selection and resubmission of only one card for processing.

FIG. 1 shows an exemplary terminal process loop 100 for collision detection and avoidance. The terminal process loop may be implemented in the terminal making use of the functionalities located in the card reader device. In process loop 100, at step 1, the terminal and PCD initiate a polling sequence to detect both Type A and Type B cards that may be present in the PCD operating field. For this purpose, the PCD may send repeated Type A and Type B wake-up commands to receive acknowledgements from any activated cards present.

At step 3, terminal process 100 assesses the number of cards present. If only one card is polled, at next step 4 terminal processes 100 identifies the type of the card present, namely Type A or Type B. Then, according to the card type identified A or B, the PCD activates the card at steps 5 or step 8. The terminal then may use suitable terminal applications to process the card transaction (steps 6 or step 9). After the card transaction is completed, the terminal may instruct the PCD to deactivate the processed card. The processed card is removed from the operating field (steps 7 and 10), allowing terminal process 100 to return to its starting state 0 for a next collision detection and polling sequence.

If step 1 polling results show at step 3 that no cards are present, terminal process 100 returns to its starting state 0 to initiate the next collision detection and polling sequence. If step 1 polling results show that two or more cards are present (i.e., the PCD receives a response from more than one card) then at step 2, the PCD reports a collision to the terminal and resets the cards (i.e. no carrier for a time tRESET). In this case, terminal process 100 does not proceed to process a transaction, but returns to its starting state 0 for the next polling sequence. Step 2 may involve generating alarms or messages alerting operators and/or users to the presence of multiple cards.

The PCD device included in the terminal is configured so that its functions are suitable for implementing the collision detection and avoidance scheme (e.g., terminal process 100). Table I is a list of the exemplary functional requirements for a PCD device, which is configured for implementing terminal process 100.

TABLE I

PCD REQUIREMENTS RELATED
TO TERMINAL PROCESS 100

1. The PCD shall have only one communication signal interface active during a communication session, i.e. the PCD can communicate via either Type A or Type B interfaces. The PCD shall not mingle the two interfaces except under limited circumstances.
2. The PCD can change from one communication signal interface to another (i.e. Type A to Type B, or vice versa):
   During the polling sequence (terminal process 100, step 1)
   By deactivating the active communication signal interface action using a provided deselection command.
   Upon removal of the PICC.
   Subsequent sessions may then proceed with either Type A to Type B TABLE I-continued

PCD REQUIREMENTS RELATED
TO TERMINAL PROCESS 100 modulation method.
3. The PCD shall alternate between modulation methods when idling before detecting the presence of a PICC of Type A or Type B.
4. Once only a single PICC is detected during the polling and collision detection process (i.e., terminal process 100, step 1), the PCD shall activate the detected PICC to initiate the transaction process (i.e., terminal process 100, steps 5 or 8).
5. During the transaction process (i.e., terminal process 100, steps 5–10), the PCD shall not initiate any communication with another PICC.

In terminal process 100, the PCD polls for cards of both Type A and Type B to ensure that there is only one card present in its operating field. To detect multiple PICCs within the field, the PICC and PCD are required to implement a protocol that detects the condition that more than one PICC are active. Under this protocol, the PCD is the initiating device which initiates PICC communication activity by issuing wake-up commands (WUPA and WUPB, for Type A and Type B cards, respectively) to prompt the PICCs to respond. When more than one PICC responds, the terminal will not initiate or proceeds a transaction (see e.g., terminal process 100, step 2).

The collision detection mechanism used by the PCD varies with card type. Type A PICCs use Manchester coding and answer synchronously to wakeup commands. These features allow the PCD to detect a collision at bit level for Type A PICCs (i.e. a situation where at least two Type A PICCs simultaneously transmit bit patterns with complementary values for one or more bit positions). In this case, the bit patterns merge and the carrier is modulated with the subcarrier for all of the (100%) bit duration. A collision detection algorithm for Type A cards may be based on binary search techniques.

In contrast to the Type A PICCs' synchronous response, Type B PICCs respond asynchronously to wake-up commands. To detect whether more than one Type B PICC is present in the Operating Field, the PCD performs a WUPB command that is set to require all Type B PICCs to respond in the first time slot (N=1). Responses by more than one Type B PICCs in the first time slot cause a transmission error, which is recognized as an indication of a collision of Type B PICCs.

FIG. 2 shows a PCD process 200 for collision avoidance and polling, which is generic (i.e. applicable to both Type A and Type B cards). PCD process 200 may be made available to terminal process 100 and may be used, for example, in terminal process 100 steps 1-3.

In process 200, the PCD probes it operating field by alternately issuing wake-up commands (e.g., WUPA for Type A cards and WUPB for Type B cards), to prompt cards to respond (e.g. steps 10, 70, 110 and 150). The PCD waits a defined time period tp before issuing each alternate WUPA and WUPB command (e.g., steps 60, 90, 100, 140, 170, and 180). At steps 20, 40, 80, 120 and 160, process 200 evaluates responses received to the preceding issued WUPA or WUPB command. If no response is received to a particular type wake-up command (e.g. WUPB step 70, WUPA step 150), process 200 recognizes that there are either no cards of the particular type in the operating field or that only cards of the other type may be present.

In process 200, if a transmission error is received in response to a WUPA command issued, for example, at step 10, then the PCD assumes there is more than one Type A PICC (i.e. a collision) in the operating field and resorts to exception processing (transmission error). If the PCD receives a valid acknowledgement command (ATQA) from a Type A PICC, the PCD assumes that there is at least one Type A PICC in the operating field and stores the ATQA information before proceeding at step 30 with a Type A collision detection algorithm (e.g., collision detection algorithm 300 FIG. 3). The results of the Type A collision detection algorithm are evaluated at step 40. If the Type A collision detection algorithm 300 detects that more than one Type A PICC is present in the operating field (i.e. a collision), then the PCD resorts to exception processing (transmission error). Alternatively, if only one Type A PICC is detected, then the PCD at step 50 issues a command (HALTA) to place the one identified Type A PICC in a halt state.

Similarly in process 200, if a transmission error is received in response to a WUPB command issued, for example, at step 110, then the PCD assumes there is more than one Type B PICC (i.e. a collision) in the operating field and resorts to exception processing (transmission error). If the PCD receives a valid acknowledgement command (ATQB) from a Type B PICC then the PCD assumes there is only one Type B PICC in the operating field and issues a command (HALTB) to place the one identified Type B PICC in a halt state.

After the one identified PICC of either type has been placed in a halt state (e.g., at step 50 or step 130), the PCD issues a wakeup commands at steps 70 and 150 as appropriate for the opposite type of card to foreclose the possibility of collision between two cards of opposite type (i.e. the presence of one Type A PICC and one Type B PICC card) in the operating field. The responses to either of the wake-up commands are evaluated at steps 80 or 160. If the responses are positive, collision is indicated.

Figure 3B:
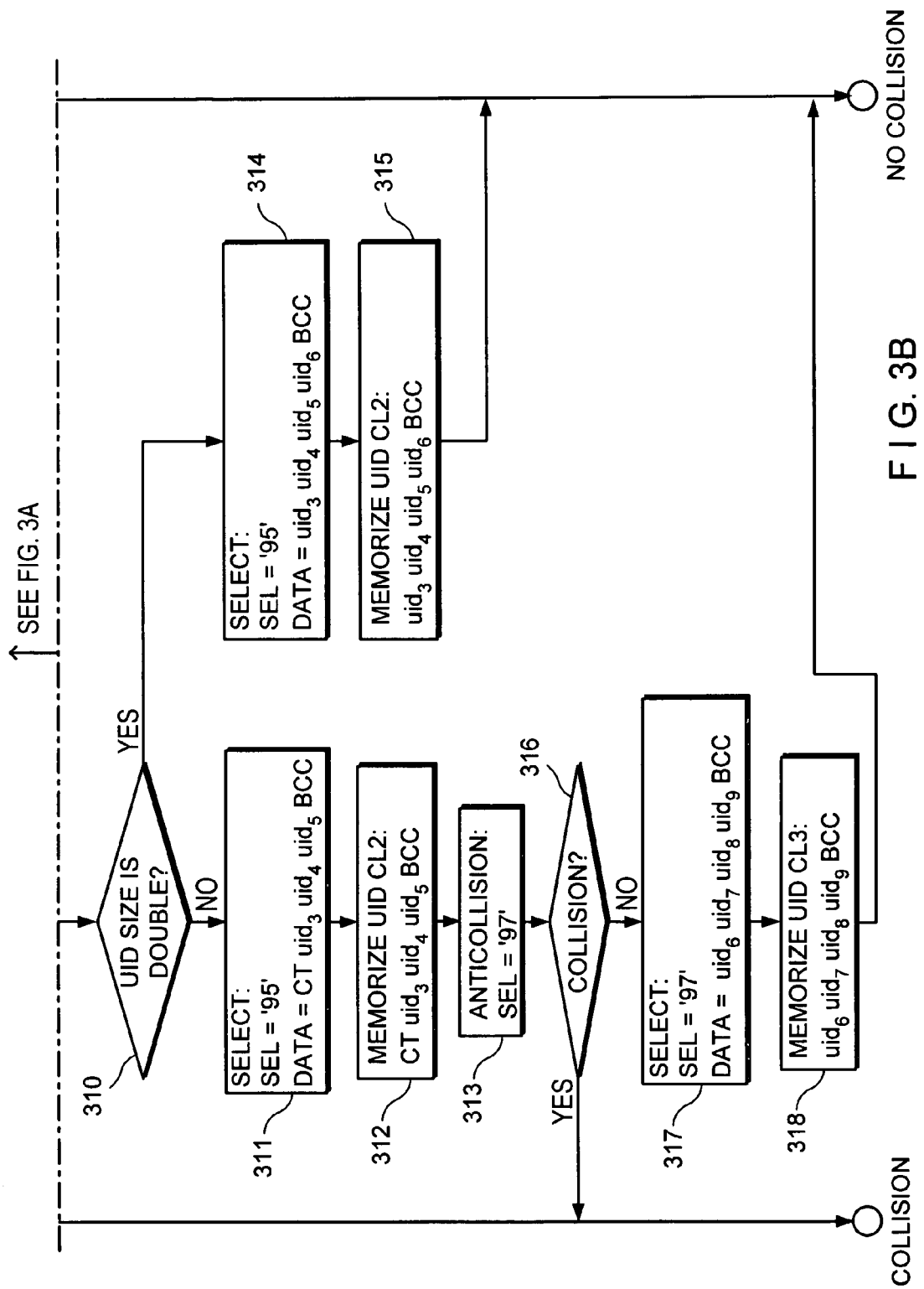

FIG. 3 shows an exemplary collision detection algorithm 300, which may be used to investigate Type A card collisions after an ATQA acknowledgement without bit collision has been received in response to a WUPA command (e.g., at step 30, process 200). For investigating Type A collision, the PCD retrieves the UID from Type A PICC card. If the PCD is able to retrieve the UID of the Type A PICC card without any bit collision error, then the PCD may conclude that there is only one Type A PICC present in its operating field (e.g., at step 40, process 200). Collision detection algorithm 300 is utilized to retrieve the UID from the PICC.

At step 310, the PCD starts detection algorithm 300 by sending an ANTICOLLISION command with SEL='93' (See e.g., Appendix A) to retrieve the complete UID of the Type A PICC and to detect whether more than one PICC of Type A is present in the operating field. If at step 302 the PCD receives a transmission error in the response to the ANTICOLLISION command, then collision is indicated and the PCD resorts exception processing (transmission error). If at step 303, the ATQA shows a single size UID, the complete UID (=UID CL1: uid0 uid1 uid2 uid3 BCC) has been retrieved from the PICC. Accordingly, only one Type A card is present and no collision with other Type A cards in indicated. Then at step 307, the PCD proceeds to put the PICC in the ACTIVE state by sending a SELECT command with SEL='93' and UID CL1. At step 308, the PCD stores or memorizes the complete UID If at step 303, the ATQA shows a double or triple size UID, the PCD proceeds cascade level-by-cascade level. First at step 304, the PCD selects cascade level 1 by sending a SELECT command with SEL='93' and UID CL1. Then at step 305, the PCD stores or memorizes the UID CL1 before proceeding to cascade level 2. At step 306, the PCD continues with cascade level 2 by sending an ANTICOLLISION command with SEL='95'.

Like step 302, if at step 309 the PCD receives a transmission error in the response to the ANTICOLLISION command then collision is indicated, in response to which the PCD resorts exception processing (transmission error). Similarly, if at step 310 the received ATQA shows a double size UID, the complete UID (=UID CL1: uid0 uid1 uid2 BCC; UID CL1: uid3 uid4 uid5 uid6 BCC) has been retrieved from the PICC. Accordingly, only one Type A card is present and no collision with other Type A cards in the operating volume of the reader indicated. Then at steps 314 and 315, like at steps 307 and 308, the PCD proceeds to put the identified PICC in the ACTIVE state by sending a SELECT command with SEL='93' and UID CL1, and to store or memorize the complete UID.

If at step 310, the ATQA shows a triple size UID, the PCD at step 311 selects cascade level 2 by sending a SELECT command with SEL='95' and UID CL2. Then at step 312, the PCD stores or memorizes the UID CL2. At step 313, the PCD continues with cascade level 3 by sending an ANTICOLLISION command with SEL='97'. If at step 316 the PCD detects a transmission error in the response to this ANTICOLLISION command, collision is indicated and the PCD resorts to exception processing (transmission error). If no transmission error-free ATQA command is received from the PICC, the complete UID (=UID CL1: CT uid0 uid1 uid2 BCC; UID CL2: CT uid3 uid4 uid5 BCC; UID CL3: uid6 uid7 uid8 uid9 BCC) has been retrieved from the PICC. Accordingly, only one Type A card is present and no collision with other Type A cards in indicated. Then at steps 317 and 318, like at steps 307 and 308, the PCD proceeds to put the identified PICC in the ACTIVE state by sending a SELECT command with SEL='97' and UID CL3, and to store or memorize the complete UID.

After only one card has been identified as being present in the operating field of the reader (e.g., Type B in terminal process 200 step 130, or Type A in algorithm 300 steps 307 or 314, etc.), the card is activated. The PCD/terminal proceeds to communicate with the activated card and completed the desired transaction. After the desired transaction is completed, the subject card is deactivated.

During terminal process 200 or algorithm 300, when collision is indicated, the PCD resorts to exception processing. No transactions are conducted until the exception is satisfactorily cleared. During the polling and collision detection sequence upon detection of a transmission error indicating collision, the PCD reports the collision detection to the terminal and resets the PICC the PCD for a time period tRESET. During this time period tRESET, no carrier signal is transmitted to the PICCs. The PCD returns to the polling and collision detection sequence. The PCD's report of the collision detection to the terminal, can lead to user intervention to clear the multiple cards present in the operating field.

While the present invention has been particularly described with reference to exemplary embodiments thereof, it will be understood by those skilled in the art that various modifications and alterations may be made without departing from the spirit and scope of the invention. Accordingly, the disclosed embodiments of the invention are considered merely illustrative, and the invention is limited in scope only as specified in the appended claims.

We claim:

1. An electronic payment system for processing a contactless payment card transaction (i.e., a contactless payment transaction), the electronic payment system comprising a card reader which is configured to process the transaction when one and only one contactless payment card is present in the card reader's operating field, wherein the card reader deploys collision detection algorithms to detect and report a collision instance in which multiple contactless payment cards are present in the card reader's operating field, and wherein the system halts processing the payment in the instance a collision is detected.

2. The electronic payment system of claim 1 further comprising a terminal to which the card reader is coupled, the terminal comprising transaction-processing applications.

3. The electronic payment system of claim 1, wherein contactless payment cards are one of several different types of contactless payment cards including ISO 14443 Type A and Type B cards, wherein the collision detection algorithm includes the steps of detecting collisions of a first type of cards and detecting collisions of the first type of cards and a second type of cards.

4. The electronic payment system of claim 1 wherein the card reader is configured to alternately poll a first type of cards and a second type of cards.

5. The electronic payment system of claim 4 wherein the card reader is configured to identify the type of the only one card present in the card reader's operating field, and accordingly activate the card for a communication session.

6. The electronic payment system of claim 1 wherein the card reader is configured to deactivate the only one card present in the card reader's operating field upon processing the transaction.

7. The electronic payment system of claim 1 wherein the card reader deploys a collision detection algorithm comprising a binary search routine to detect collisions of ISO 14443 Type A contactless payment cards.

8. The electronic payment system of claim 1 wherein the card reader wherein the card reader deploys a collision detection algorithm comprising a Slotted Aloha routine to detect collisions of ISO 14443 Type B contactless payment cards.

9. The electronic payment system of claim 1, wherein contactless payment cards are one of several different types of contactless payment cards including ISO 14443 Type A and Type B cards, wherein the card reader deploys a collision detection algorithm by which after one card of a type has been identified as present in the card reader's operating field, the card reader polls for the presence of another type of card.

10. An electronic payment system for processing a contactless payment card transaction (i.e., a contactless payment transaction), the electronic payment system comprising a card reader which is configured to process the transaction when one and only one contactless payment card is present in the card reader's operating field, wherein the card reader deploys collision detection algorithms to detect and report a collision instance in which multiple contactless payment cards are present in the card reader's operating field, and wherein the system halts processing the payment in the instance a collision is detected; and wherein the card reader is configured to have only a communication signal interface corresponding to a single card type active during a communication session.

11. A collision detection and avoidance method for processing payment by a contactless payment card at a card reader, the method comprising the steps of: a. investigating the presence of payment cards in an operating field of the Card reader; b. in response to step (a), processing the payment transaction involving the contactless payment card and the card reader if and only if the contactless payment card is the only card present in the operating field of the card reader; and c. reporting and halting processing of the payment transaction when more than one payment card is present in the operating field of the card reader.

12. The collision detection and avoidance method of claim 11 wherein contactless payment cards are one of several different types of contactless payment cards including ISO 14443 Type A and Type B cards, wherein the interacting contactless payment cards comprise a first type of card and a second type of cards, and wherein step (a) comprises using a polling sequence to detect the presence of both types of cards.

13. The collision detection and avoidance method of claim 12 wherein polling sequence comprises alternating wake-up commands for the first type and the second type of cards.

14. The collision detection and avoidance method of claim 12 wherein step (a) comprises identifying the type of card present, when only one card is found to be present in the operating field of the card reader.

15. The collision detection and avoidance method of claim 14 wherein step (b) comprises activating a communication session between the identified only one card and the card reader according to the type of the card to initiate processing of a transaction.

16. The collision detection and avoidance method of claim 15, further comprising deactivating the card after processing the transaction.

17. The collision detection and avoidance method of claim 11 wherein step (a) comprises using a binary search algorithm to detect collisions of ISO 14443 Type A contactless payment cards.

18. The collision detection and avoidance method of claim 11 wherein step (a) comprises using a Slotted Aloha algorithm to detect collisions of ISO 14443 Type B contactless payment cards.

19. The collision detection and avoidance method of claim 11, wherein contactless payment cards are one of several different types of contactless payment cards including ISO 14443 Type A and Type B cards, wherein step (a) comprises, after one card of a type has been identified as present in the card reader's operating field, polling for the presence of another type of card.

20. A collision detection and avoidance method for processing payment by a contactless payment card at a card reader, the method comprising the steps of:
   a. investigating the presence of payment cards in an operating field of the card reader;
   b. in response to step (a), processing the payment transaction involving the contactless payment card and the card reader if and only if the contactless payment card is the only card present in the operating field of the card reader; and
   c. halting processing of the payment transaction when more than one payment card is present in the operating field of the card reader;
   wherein contactless payment cards are one of several different types of contactless payment cards including ISO 14443 Type A and Type B cards, wherein the interacting contactless payment cards comprise a first type of card and a second type of cards, and wherein step (a) comprises using a polling sequence to detect the presence of both types of cards;
   wherein step (a) comprises identifying the type of card present, when only one card is found to be present in the operating field of the card reader;
   wherein step (b) comprises activating a communication session between the identified only one card and the card reader according to the type of the card to initiate processing of a transaction;
   wherein the card reader is coupled to terminal which is configured with transaction processing applications, wherein steps (a)-(c) are directed by a terminal process, and wherein step (b) comprises using a terminal transaction processing application to process the transaction.

* * * * *